(12) United States Patent
Chen et al.

(10) Patent No.: US 7,567,393 B2
(45) Date of Patent: Jul. 28, 2009

(54) LENS-ASSEMBLING JIG, ASSEMBLING SYSTEM HAVING SAME AND ASSEMBLING METHOD

(75) Inventors: Chia-Hung Chen, Taipei Hsien (TW); Chin-Ching Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/870,095

(22) Filed: Oct. 10, 2007

(65) Prior Publication Data

US 2008/0158699 A1 Jul. 3, 2008

(30) Foreign Application Priority Data

Dec. 29, 2006 (CN) .......................... 2006 1 0201476

(51) Int. Cl.
*G02B 3/00* (2006.01)
(52) U.S. Cl. ........................................ 359/809
(58) Field of Classification Search ................. 359/819, 359/900
See application file for complete search history.

(56) References Cited

U.S. PATENT DOCUMENTS 6,757,112 B1 6/2004 Whitty

FOREIGN PATENT DOCUMENTS

JP 404051105 A * 2/1992 ................. 359/819

* cited by examiner

*Primary Examiner*—Ricky L Mack
*Assistant Examiner*—Vipin M Patel
(74) *Attorney, Agent, or Firm*—Zhigang Ma

(57) ABSTRACT

An assembling system for assembling lens includes a base, a lens-assembling jig mounted on the base, an elastic member, and a push rod. The lens-assembling jig includes a first cylinder, a second cylinder coaxially connected to the first cylinder, and a post rod. The elastic member is disposed between the base and the second cylinder. The post rod is configured for pushing the optical elements into the first cylinder from the second cylinder. The system for assembling lens can accurately assemble the optical elements, so it can improve the capability of the lens module to capture image. The present invention also discloses an assembling method using the assembling system.

8 Claims, 6 Drawing Sheets

LENS-ASSEMBLING JIG, ASSEMBLING SYSTEM HAVING SAME AND ASSEMBLING METHOD

TECHNICAL FIELD

The present invention relates generally to an assembling technology of lens modules, and more particularly, to a lens-assembling jig, and as well as an assembling system having the same and an assembling method for assembling the lens modules.

BACKGROUND

With the development of science and technology, portable electronic devices, such as mobile telephones, personal digital assistants (PDAs) or the like are now in widespread use. Portable electronic devices including image capture devices are becoming increasingly fashionable, but size and weight restrictions mean that lens modules included in these image capture devices need to be small, thin and lightweight in construction. Lens-assembling jigs used for assembling the lens module affect the capability of the lens module to capture image. Therefore, an improvement in the lens-assembling jig will help to improve the quality and ease with which the lens module captures images.

Generally, a lens-assembling jig of an assembling system includes a platform configured (i.e., structured and arranged) for disposing and fixing a lens barrel, at least a clamping jig configured for clamping optical elements, such as a lens, a spacer, a filter and so on. The clamping jig can be a holding jaw or a suction nozzle.

In assembly, the lens barrel is disposed and fixed on the platform by the clamping jig. The lens, the spacer and the filter are assembled into the lens barrel in order written.

However, in the process of assembling the optical elements, the optical elements may incline to a side of the lens barrel because a diameter of one or more the optical elements is equal or larger than an inner diameter of the lens barrel and the optical elements are blocked by the lens barrel. And the optical elements cannot be assembled into the accurate position in the lens barrel because the cumulation of the optical elements, and so, the capability of the lens module to capture images is impaired.

Therefore, the present invention provides an improved lens-assembling jig and an assembling method thereof that can overcome or at least reduce the disadvantages set forth above.

SUMMARY

In accordance with an embodiment, an exemplary lens-assembling jig for assembling a lens module including a lens barrel and a plurality of optical elements received in the lens barrel, includes a first cylinder configured for receiving the lens barrel, a second cylinder coaxially connected to the first cylinder and configured for receiving the optical elements, and a post rod. The second cylinder has a through aperture defined in one end thereof and is oriented away from the first cylinder. The post rod runs through the through aperture and is configured for pushing the optical elements from the second cylinder into the first cylinder.

In accordance with an embodiment, an exemplary assembling system includes a base, with the above described lens-assembling jig mounted on the base, an elastic member disposed between the base and the lens-assembling jig, and a push rod. The elastic member is coiled around the post rod of the lens-assembling jig. The push rod is configured for pressing the first cylinder of the lens-assembling jig towards the second cylinder.

In accordance with an embodiment, an assembling method for assembling a lens module includes the following steps: placing optical elements into a second cylinder of a lens-assembling jig in a predetermined order; placing a lens barrel into a first cylinder coaxially connected to the second cylinder of the lens-assembling jig; pressing the lens barrel received in the first cylinder to move towards the optical elements received in the second cylinder and allow the optical elements to be inserted into the lens barrel.

BRIEF DESCRIPTION OF THE DRAWINGS

Many aspects of the lens-assembling jig, assembling system having the same and assembling method can be better understood with reference to the following drawings. The components in the drawings are not necessarily drawn to scale, the emphasis instead being placed upon clearly illustrating the principles of the present the lens-assembling jig and assembling system having the same. Moreover, in the drawings, like reference numerals designate corresponding parts throughout the several views.

DETAILED DESCRIPTION OF THE PREFERRED EMBODIMENTS

An embodiment of a present lens-assembling jig, an assembling system having the same and an assembling method will now be described in detail below and with reference to the drawings.

Figure 1:
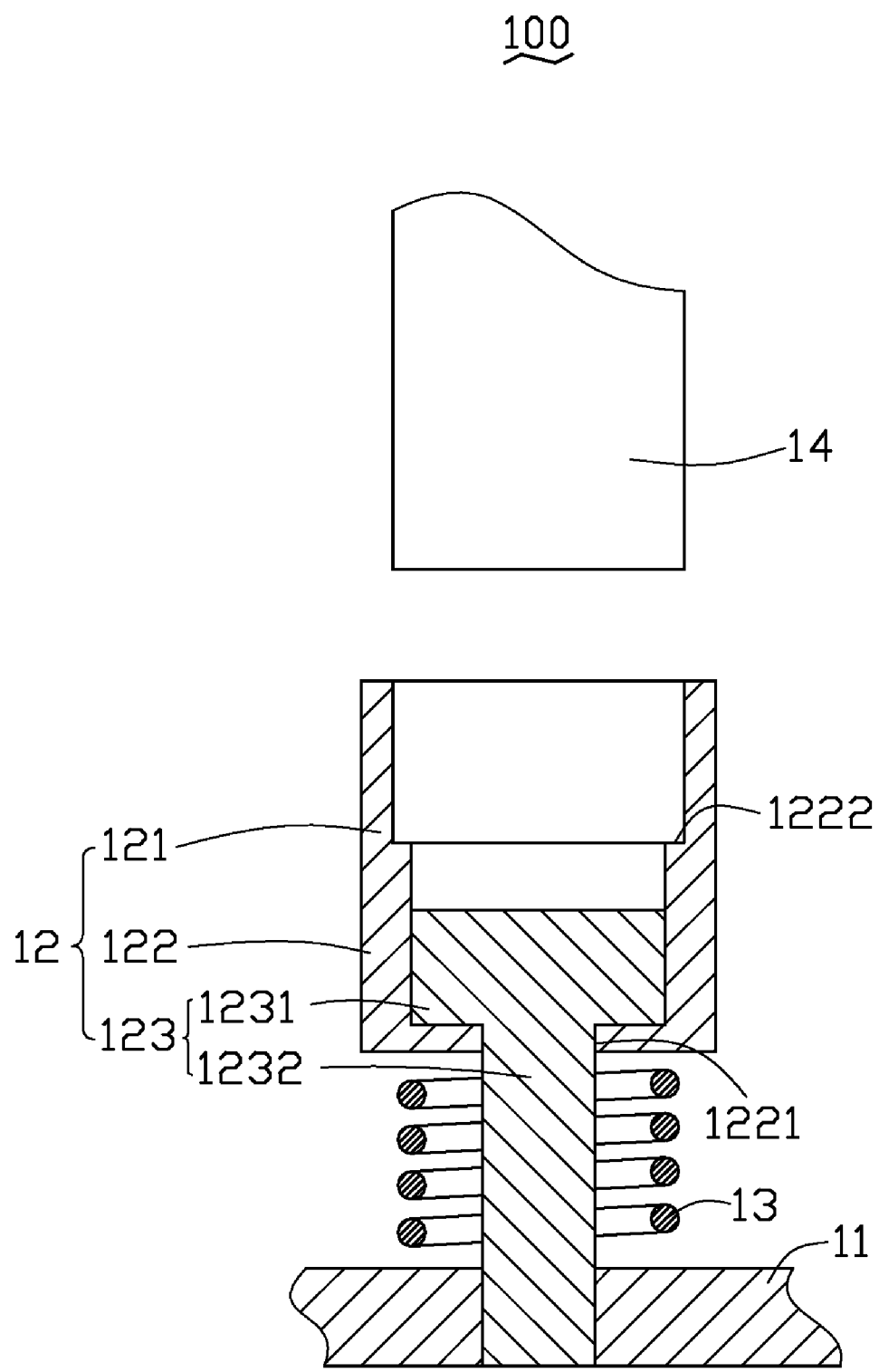
FIG. 1 is a schematic view of an assembling system having a lens-assembling jig according to a preferred embodiment of the present invention.
Figure 2:
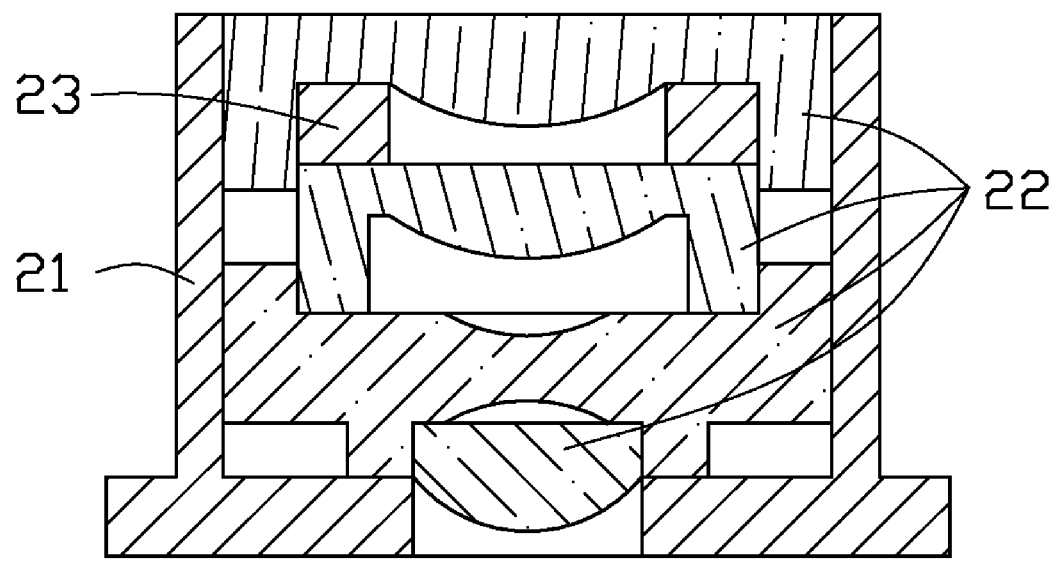
FIG. 2 is a schematic view of a lens module to be assembled of the preferred embodiment of the present invention.

Referring to FIG. 1 and FIG. 2, an exemplary assembling system 100, which is adapted to assemble a lens module 20 according to the present embodiment, includes a base 11, a lens-assembling jig 12 mounted on the base 1, an elastic member 13 disposed between the base 11 and the lens-assembling jig 12, and a push rod 14.

The lens module 20 includes a lens barrel 21 and a plurality of optical elements 22 received in the lens barrel 21. The lens module 20 also includes a spacer 23 configured for spacing the optical elements 22.

The base 11 is fixed on a machine (not shown) and can be moved according to demand.

The lens-assembling jig 12 includes a first cylinder 121, a second cylinder 122 coaxially connected to the first cylinder 121 and a post rod 123. The first cylinder 121 is configured for receiving the lens barrel 21. It can be appreciated that an inner diameter of the first cylinder 121 is essentially equal to an external diameter of the lens barrel 21, thus facilitating a tight contact between the inner surface of the first cylinder 121 and the outer surface of the lens barrel 21. The second cylinder 122 can be integrally formed with the first cylinder 121. Alternatively, the second cylinder 122 can be connected with the first cylinder 121 by screw, adhesive or the like. In present embodiment, the second cylinder 122 is integrally formed with the first cylinder 121. The second cylinder 122 is configured for receiving the optical elements 22. It can be appreciated that an inner diameter of the second cylinder 122 is essentially equal to a maximum diameter of the optical elements 22 in order to make sure the optical elements 22 are immovably received in the second cylinder 122. The inner diameter of the second cylinder 122 is less than that of the first cylinder 121 in order to form a platform 1222 therebetween. The platform 1222 is configured for positioning the lens barrel 21. A radial thickness of the platform 1222 is determined by a difference between the inner diameters of the first cylinder 121 and the second cylinder 122.

The second cylinder 122 has a through aperture 1221 defined in one end thereof and is away from the first cylinder 121, and a diameter of the through aperture 1221 is less than the inner diameter of the second cylinder 122.

The post rod 123 is fixed on the base 11 and runs through the through aperture 1221 of the second cylinder 122. The post rod 123 is configured for pushing the optical elements 22 received in the second cylinder 122 into the lens barrel 21 received in the first cylinder 121. The post rod 123 includes a body rod 1232 and an end rod 1231 integrally formed with the body rod 1232. A length of the post rod 123 along an axis of the post rod 123 is larger than that of the second cylinder 122 along an axis of the second cylinder 122. The end rod 1231 is received in the second cylinder 122 and a diameter of the end rod 1231 is smaller than the inner diameter of the second cylinder 122 and larger than that of the through aperture 1221 in order to make sure the post rod 123 cannot slide out from the through aperture 1221 of the second cylinder 122. A diameter of the cylinder 1232 is less than that of the through aperture 1221, thus allowing the body rod 1232 to move along the through aperture 1221.

The push rod 14 can be cylindrical, square, rectangular or hollow cylinder. In present embodiment, the push rod 14 is a solid or hollow cylinder. It can be appreciated that a diameter of the push rod 14 is larger than that of the lens barrel 21. The push rod 14 is mounted on the machine (not shown) and is movable up and down relative to the base 11.

In present embodiment, the elastic member 13 is a spring and is disposed between the base 11 and the second cylinder 122 so as to reduce an impact from the push rod 124. The elastic member 13 is coiled around the body rod 1232 of the post rod 123. The first cylinder 121 and the second cylinder 122 can be repositioned by elasticity of the elastic member 13 when assembly is finished. A diameter of the elastic member 13 is less than an external diameter of the second cylinder 122 and is bigger than that of the body rod 1232 so that the elastic member 13 can be coiled around the body rod 1232 and not slides out from the second cylinder 122.

Figure 3:
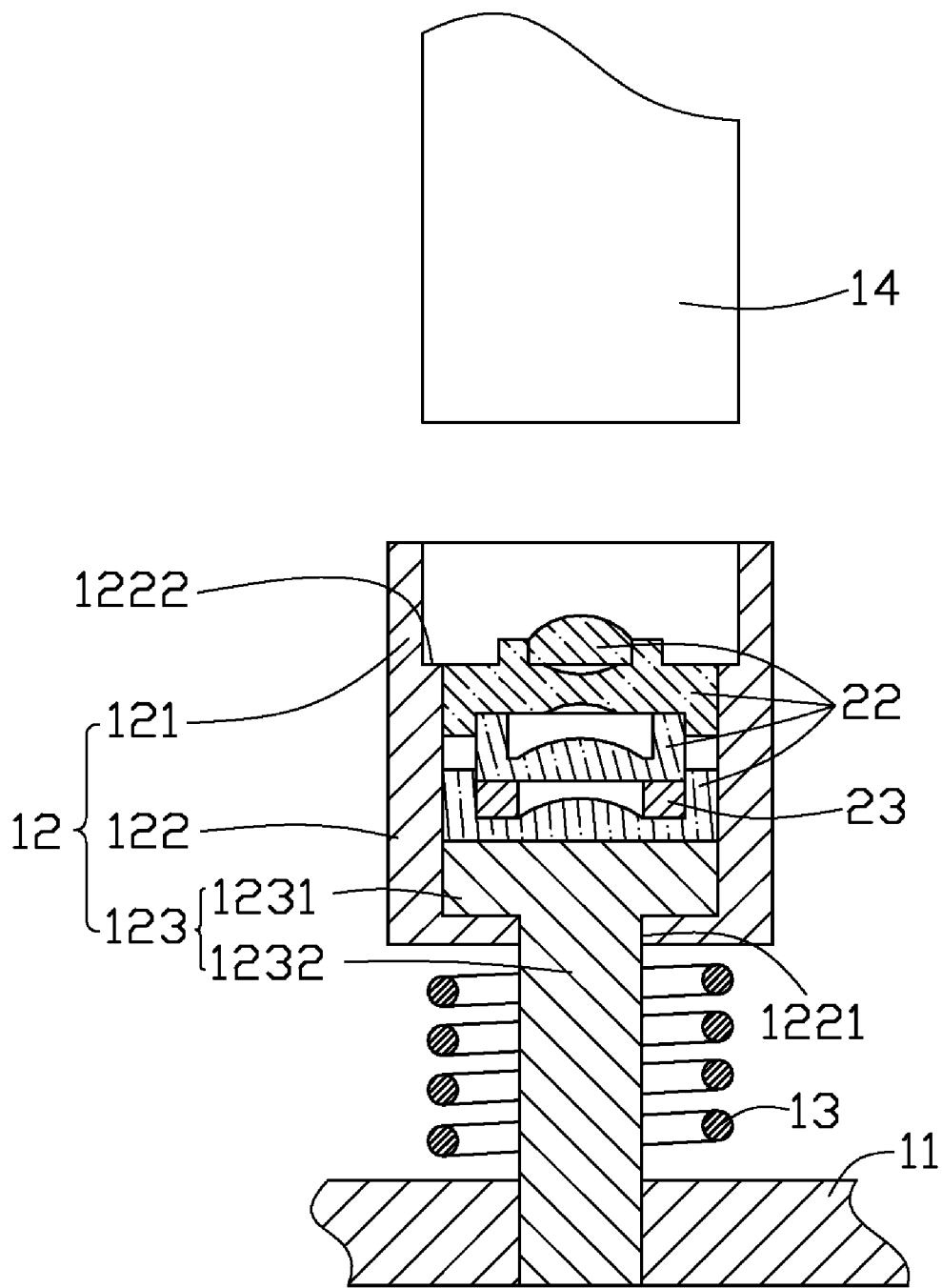
FIG. 3 is a schematic view of the assembling system of FIG. 1, but showing optical elements of the lens module of FIG. 2 received in a second cylinder of the assembling system.
Figure 5:
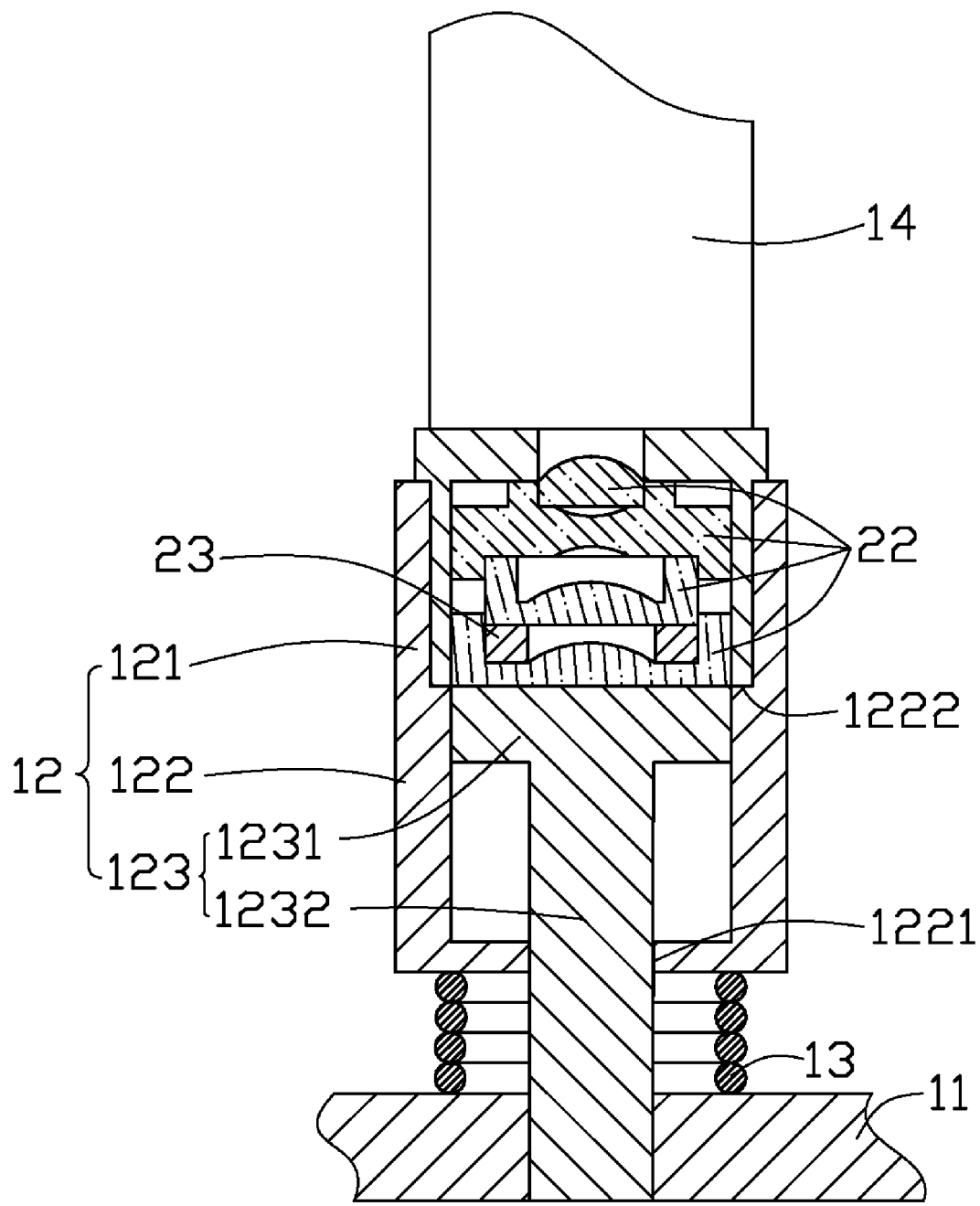
FIG. 5 is a schematic view of pushing the lens barrel received in the first cylinder to move towards the optical elements received in the second cylinder and allow the optical elements to be inserted into the lens barrel.
Figure 6:
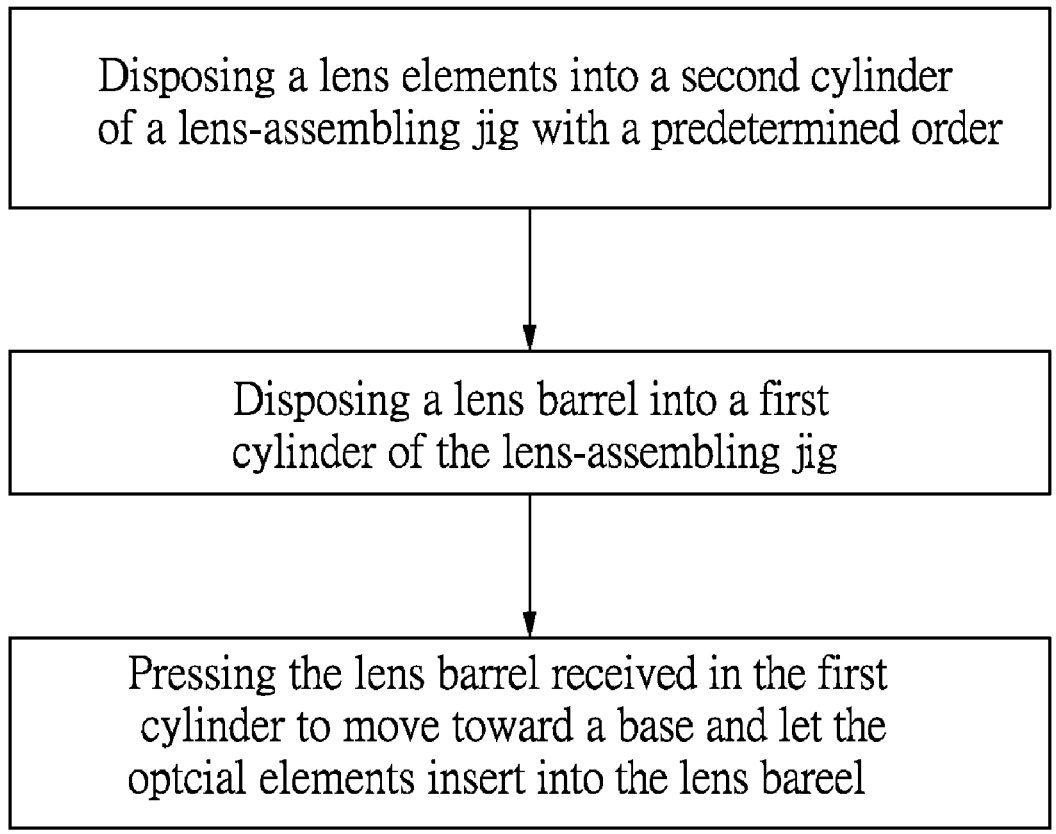
FIG. 6 is a flow chart of assembling the lens module of FIG. 2.

FIG. 6 is a flow chart of assembling the lens module using the assembling system 100. Referring to the FIG. 3, FIG. 4 and FIG. 5, the assembling method includes following steps:

Step 1: placing the optical elements 22 into the second cylinder 122 of the lens-assembling jig 12 in a predetermined order (shown in FIG. 3). After the optical elements 22 are disposed into the second cylinder 122 and supported on the end rod 1231, the second cylinder 122 tightly contacts with the optical elements 22, as the inner diameter of the second cylinder 122 is equal to the maximum diameter of the optical elements 22.

Figure 4:
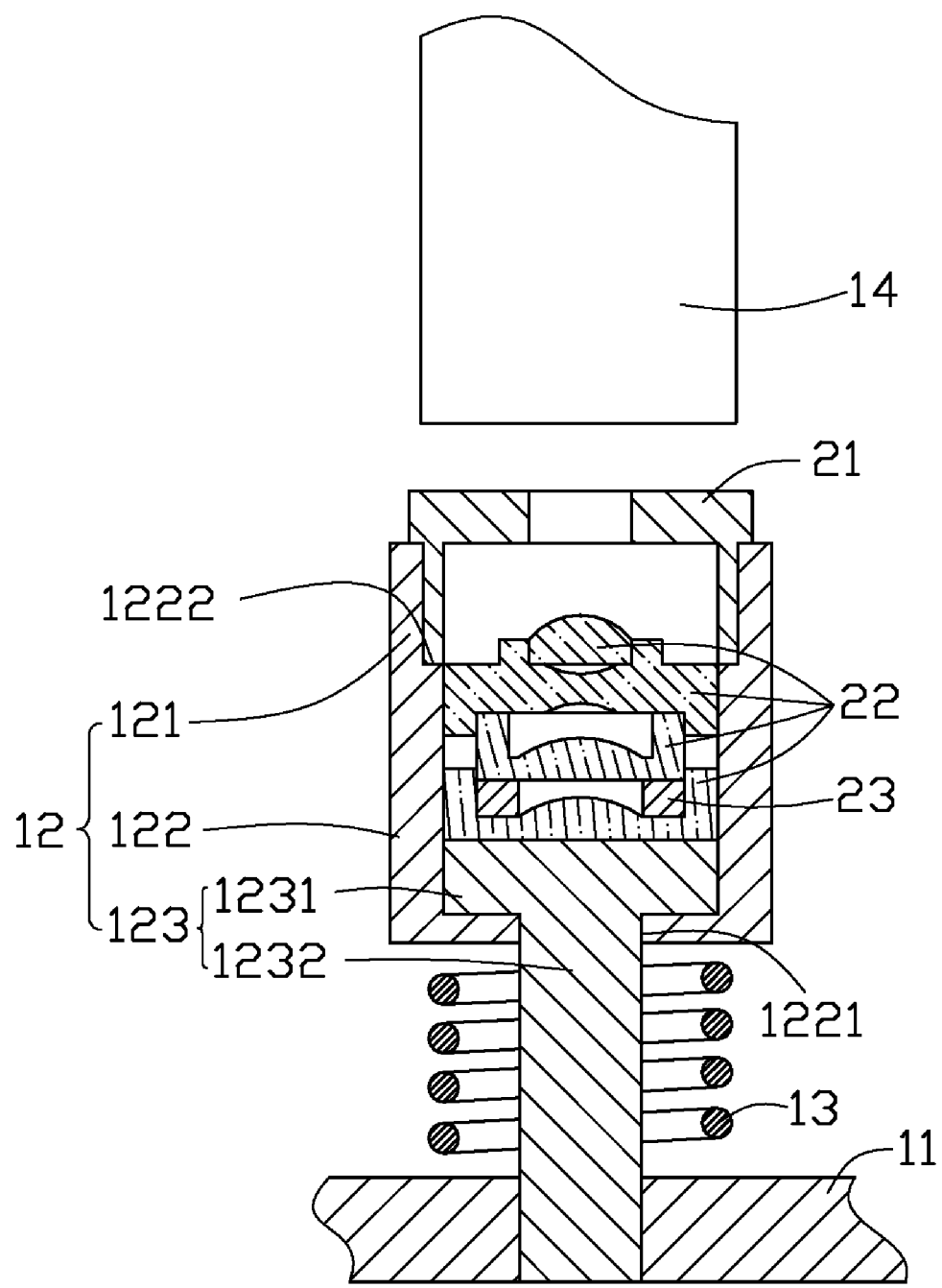
FIG. 4 is a schematic view of the assembling system of FIG. 3, but showing a lens barrel of the lens module of FIG. 2 received in a first cylinder of the assembling system.

Step 2: placing the lens barrel 21 into the first cylinder 121 coaxially connected to the second cylinder 122 of the lens-assembling jig 12 (shown in FIG. 4). After the lens barrel 21 is disposed into the first cylinder 121, the lens barrel 21 is placed on the platform 1222 formed between the first cylinder 121 and the second cylinder 122. The lens barrel 21 tightly contacts with the first cylinder 121 since the inner diameter of the first cylinder 121 is equal to the external diameter of the lens barrel 21.

Step 3: pressing the lens barrel 21 received in the first cylinder 121 via the push rod 14 moving downward to move towards the optical elements 22 received in the second cylinder 122 and allow the optical elements 22 to be inserted into the lens barrel 21 (shown in FIG. 5). The first and second cylinders 121, 122 are moved downward to compress the spring 13. The lens barrel 21 is pressed by the push rod 14 to move toward the optical elements 22. Accordingly, the optical elements 22 are inserted into the lens barrel 21. After that, the push rod 14 retracts to its original position and the combined lens barrel 21 and optical elements 22 can be taken out from the first cylinder 121.

Of course, the assembling system 100 can also assemble a plurality of optical elements into a lens assembly, such as a spacer or a filter. In this instance, the lens assembly is assembled in the second cylinder 122 and the push rod 14 need to be inserted into the first cylinder 121. Therefore, a diameter of the push rod 14 should be essentially equal to or less than the inner diameter of the first cylinder 121. The lens, the spacer and the filter are placed into the second cylinder 122 and then the lens, the spacer and the filter are connected using the post rod 123 and the push rod 14. The assembling methods of the lens, the spacer and the filter are the same as that of the lens module 20. Finally, the lens barrel 21 is placed in the first cylinder 121 and the lens assembly is inserted into the lens barrel 21 by the push rod 14 as in the above described method.

In above steps, firstly, the optical elements are disposed into the second cylinder, then, the lens barrel is disposed into the first cylinder, and finally, the optical elements are inserted into the lens barrel. The assembly of the lens module is finished. The assembling method makes the optical elements less inclined to be positioned at a slant when the optical elements are assembled because the optical elements are not limited by the size of the lens barrel. So, the capability of the lens module to capture image is improved.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens-assembling jig for assembling a lens module, which includes a lens barrel and a plurality of optical elements received in the lens barrel, comprising:

a first cylinder configured for receiving the lens barrel of the lens module;

a second cylinder coaxially connected to the first cylinder and configured for receiving the optical elements, the second cylinder having a through aperture defined in one end thereof, which is oriented away from the first cylinder, the diameter of the through aperture being less than the inner diameter of the second cylinder; and a post rod running through the through aperture and configured for pushing the optical elements from the second cylinder into the first cylinder, the post rod comprising a body rod and an end rod, the end rod being received in the second cylinder, the diameter of the end rod being larger than that of the through aperture.

2. The lens-assembling jig as claimed in claim 1, wherein the first cylinder is integrally formed with the second cylinder.

3. The lens-assembling jig as claimed in claim 1, wherein an inner diameter of the first cylinder is bigger than that of the second cylinder.

4. The lens-assembling jig as claimed in claim 3, wherein a platform is formed between the first cylinder and the second cylinder and configured for positioning the lens barrel.

5. The lens-assembling jig as claimed in claim 1, wherein a length of the post rod along an axis of the post rod is larger than that of the second cylinder along an axis of the second cylinder.

6. An assembling system for assembling a lens module that includes a lens barrel and a plurality of optical elements received in the lens barrel, comprising:
   a base;
   a lens-assembling jig comprising a first cylinder configured for fittingly receiving the lens barrel, a second cylinder coaxially connected to the first cylinder and configured for fittingly receiving the optical elements, the second cylinder having a through aperture, and a post rod running through the through aperture, the post rod having one end fixed to the base and an opposite end configured for supporting the optical elements;
   an elastic member disposed between the base and the second cylinder; and
   a push rod movable relative to the base configured for pressing the lens barrel received in the first cylinder of the lens-assembling jig towards the base such that the optical elements are inserted into the lens barrel.

7. The assembling system as claimed in claim 6, wherein the elastic member is a spring coiled around the post rod of the lens-assembling jig, and an external diameter of the spring is less than that of the second cylinder.

8. The assembling system as claimed in claim 6, wherein an inner diameter of the first cylinder is bigger than that of the second cylinder such that a platform is formed between the first cylinder and the second cylinder for positioning the lens barrel.

* * * * *